US008356246B2

(12) United States Patent
Noferi et al.

(10) Patent No.: US 8,356,246 B2
(45) Date of Patent: Jan. 15, 2013

(54) METHOD AND SYSTEM FOR NOTIFYING A CLIENT ON SERVER DISCONNECTION IN A MANUFACTURING EXECUTION SYSTEM

(75) Inventors: Stefano Noferi, Genoa (IT); Fabrizio Camera, Serravalle Scrivia (IT)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 12/399,055

(22) Filed: Mar. 6, 2009

(65) Prior Publication Data

US 2009/0228783 A1 Sep. 10, 2009

(30) Foreign Application Priority Data

Mar. 7, 2008 (EP) .................................... 08004215

(51) Int. Cl.
*G06F 17/00* (2006.01)

(52) U.S. Cl. ....................................... 715/234; 715/200

(58) Field of Classification Search .................. 715/200, 715/234

See application file for complete search history.

(56) References Cited

U.S. PATENT DOCUMENTS 5,740,432 A * 4/1998 Mastors ............................... 1/1
5,774,717 A * 6/1998 Porcaro ............................... 1/1
5,847,957 A 12/1998 Cohen et al.
5,870,544 A * 2/1999 Curtis ............................ 726/14
6,092,078 A * 7/2000 Adolfsson ............................ 1/1
6,393,477 B1 * 5/2002 Paxhia et al. ................. 709/223
6,807,595 B2 * 10/2004 Khan et al. .................... 710/260
7,376,730 B2 * 5/2008 Pandya ......................... 709/224
7,539,746 B2 * 5/2009 Bankier et al. ................ 709/224
7,594,003 B2 * 9/2009 Davidson et al. ............. 709/219
7,725,574 B2 * 5/2010 O'Connell et al. ........... 709/224
8,051,478 B1 * 11/2011 Rajan et al. ..................... 726/22
2002/0138621 A1 9/2002 Rutherford et al.
2002/0198964 A1 * 12/2002 Fukazawa et al. ............ 709/219
2003/0093460 A1 5/2003 Kinney et al.
2006/0161906 A1 7/2006 Becker et al.
2008/0120418 A1 * 5/2008 DePree ......................... 709/227
2009/0100425 A1 * 4/2009 Russell ............................ 718/1
2010/0211626 A1 * 8/2010 Li ................................ 709/203
2010/0281118 A1 * 11/2010 Donahue et al. .............. 709/206

OTHER PUBLICATIONS

ASP.net, ASP.Net Custom Error Pages, Feb. 1, 2004, ASP.Net, pp. 1-7 (pdf).*

Adelmo et al., "Communication Protocols and Failure Semantics in Intelligent Manufacturing Systems", 1994 IEEE, pp. 3453-3458, Göteborg, Sweden.

* cited by examiner

*Primary Examiner* — Manglesh M Patel

(74) *Attorney, Agent, or Firm* — Laurence A. Greenberg; Werner H. Stemer; Ralph E. Locher

(57) ABSTRACT

A custom function is defined at engineering time for implementing actions to be executed in case of a disconnection event in which a client is unable to communicate with a server. At engineering time, code specifying the action to be implemented by the custom function is written into a function file that is stored on the web-server. Subsequently at run time, a browser running on a client requests a certain page to be displayed from the web-server. On occasion of a client-server disconnection; the communication component notifies a certain displayed page about the disconnection; and the custom function is executed with certain page being displayed.

8 Claims, 1 Drawing Sheet

1
P
CC
2
S
21
22
23
24
25

1
2
IB
P
CC
WS
S
11
12
13
14
15
16
17

1
2
P
CC
S
21
22
23
24
25

METHOD AND SYSTEM FOR NOTIFYING A CLIENT ON SERVER DISCONNECTION IN A MANUFACTURING EXECUTION SYSTEM

CROSS-REFERENCE TO RELATED APPLICATION

This application claims the priority, under 35 U.S.C. §119, of European application EP 08004215.3, filed Mar. 7, 2008; the prior application is herewith incorporated by reference in its entirety.

BACKGROUND OF THE INVENTION

Field of the Invention

The present invention relates to a method and to a system for notifying a client on server disconnection in a manufacturing execution system (MES), including a browser (IB) at a client side (1) and a web-server (WS) and a server (S) at a server side (2).

Software products for industrial control and automation have increased, with time, in scope and refinement in order to fit the large variety of IT infrastructure requirements of manufacturing companies.

As defined by the Manufacturing Enterprise Solutions Association (MESA Int'l), a Manufacturing Execution System (MES) "is a dynamic information system that drives effective execution of manufacturing operations," by managing "production operations from point of order release into manufacturing to point of product delivery into finished goods" and by providing "mission critical information about production activities to others across the organization and supply chain via bi-directional communication."

For example, Siemens Corp. offers a broad range of MES products, under its SIMATIC® product family.

As used herein, a software application refers to a set of software components developed by software developers, at developing time, to perform some useful actions within a MES system, for example, monitoring values coming from plant processes or controlling plant devices.

Typically, at engineering time, system engineers flexibly customize MES applications according to the specific manufacturing plant requirements. The MES application customization by system engineers is an important task in MES applications. In fact, software developers, at developing time, do not have the specific knowledge of specific plant requirement and thus develop a more general purpose MES application. It is then the subsequent task of system engineers to customize, at engineering time, the MES application to perform specific actions according the specific requirements of a specific manufacturing plant.

Instead, at runtime, MES applications are utilized by end-users who may be plant operators or line responsible personnel and who may utilize the MES applications without performing any programming activity.

Typically MES systems are organized with a client-server architecture in which the user interface, functional process logic ("business rules"), data storage and data access are organized as independent software modules, most often on separate platforms. The client role is to retrieve and to send information from and to a server, which implements the business logic and exposes the data in order to display it.

MES systems are provided with front-end/client GUI applications which are utilized by the end-user to control plant activities. These GUI applications display to the end-user graphical screens or pages which, for example, may summarize the state of certain parameters of the plant at a certain moment in time.

In state of the art MES systems, the MES GUIs are web-browser so that no further program installation is required at the client side.

The web-browser or browser, in the context of this invention, is defined as the client application which displays the screens or pages at the client side at run-time. Examples of web-browsers include Internet Explorer, Netscape, Mozilla, Firefox and others.

In order to design the screens/pages, system engineers typically use "ad-hoc" graphical development tool-kits provided together with the MES system. For example, SIMATIC® IT, the MES system provided by Siemens, comes together with its web-based proprietary graphical tool-kit called SIMATIC® IT Client Application Builder (CAB), which is based on Microsoft ASP.NET technology.

The general client-server architecture it is embodied in the CAB environment by means of four components:

an Internet browser where the screens are displayed;

a CAB Web Server in charge of delivering CAB screens to the Internet browser and of launching the CAB Server;

a CAB Server: in charge to expose the data a CAB Communication component in charge of sending and retrieving the data to and from the server.

Most MES client applications need a stable connection to a server in order to update values on the client or in order to be notified by messages coming from a server.

For example, if the browser is displaying to the end-user (e.g., the plant operator), a page containing certain critical control indicators of a plant, e.g. temperature of some materials, the stability of the client-server connection guarantees that the indicator values are regularly updated on the displayed page.

However, if, for some reasons, the client-server connection is lost, it is important that the end-users are notified, at the client side, so that a prompt reaction to the situation is made possible.

Unfortunately, system engineers are often unsatisfied with the predefined way in which, in MES products, end-users are notified about such disconnection events.

In fact, the widely used methods for notifying client-server disconnection to MES end-users are pre-tailored solutions which are independent from specific plant requirements.

Usually, notification techniques provide to end-users a window message box which notifies the occurrence of the client-server disconnection and which typically contains one or more buttons to be clicked by the user to overcome the situation.

For example, the window message box may contain the following text message "Server disconnection! Please press RETRY to retry to connect or RELOAD to reload the page". At the bottom of the window message are two buttons, "RETRY" and "RELOAD", which, when clicked by the end-user launch the pre-defined activities.

The main drawback of this known technique is that the message boxes to be displayed are non-custom and are defined, at developing time, by the software developers which have no knowledge of the requirements of the specific customer plant.

SUMMARY OF THE INVENTION

It is accordingly an object of the invention to provide a method and apparatus for notifying a client on server disconnection in a MES system which overcomes the above-mentioned disadvantages of the heretofore-known devices and methods of this general type and which provides a corresponding method and system for notifying a client on server disconnection which is customizable at engineering time.

With the foregoing and other objects in view there is provided, in accordance with the invention, a method and a system for notifying a client on server disconnection in a manufacturing execution system, including a browser at a client side and a web-server and a server at a server side. The method comprises the following steps, to be performed:

at engineering time:

a) defining actions to be executed at run time in case of a client-server disconnection event, comprising the following sub-items:
   inserting, in a configuration file, data pointing to a custom function for implementing actions to be executed in case of the disconnection event;
   writing code of the actions to be implemented by the custom function into a function file;
   storing the function file in the web-server;

at run time:

b) by the browser, requesting from the web-server a certain page to be displayed;
c) by the web-server, retrieving custom function data from the configuration file;
d) by the web-server, attaching to the certain page to be loaded by the Internet browser the following data: the custom function data, the custom function file and data for creating a communication component;
e) by the Internet browser, loading the certain page;
f) by the web-server, instantiating a server at the server side to maintain a connection to the client side;
g) by the certain displayed page, creating a communication component at the client side for maintaining connection the server; in the case of a client-server disconnection event:
h) by the server, notifying the communication component about the disconnection;
i) by the communication component, notifying the certain displayed page about the disconnection; and
j) by the certain displayed page, executing the custom function.

In accordance with an additional feature of the invention, the data pointing to the custom function may comprise function file name and function name.

In accordance with an added feature of the invention, the function file may be a java-script file or a visual basic file.

In accordance with an further feature of the invention, the method is further developed in that:

step g) may also include transferring the custom function data to the communication component by the certain displayed page; and step i) also includes retrieving the custom function data from the communication component by the certain displayed page.

In accordance with again another feature of the invention, the actions to be executed in case of a client-server disconnection event may be selected from the group consisting of:

reloading the displayed page;
displaying a custom error page;
writing a log file; and/or
any action achievable by a java-script on a web page.

The proposed invention allows customization of client behavior on server disconnection by associating to a server disconnection event a custom action tailored on the customer needs.

The proposed invention allows system engineers to customize according to specific plant requirements the types of notifications and/or instruction actions to be delivered at the client side upon client-server disconnection events.

With embodiments of the proposed invention, the customization of the client-server disconnection can be performed without modifying and re-deploying the MES application.

In accordance with the invention, the benefits of the end-users at the client side, upon client-server disconnection, include the following:

receiving more detailed messages;
enabling the end-user to make custom actions on a disconnection event;
changing the way in which the notification takes place;
disabling the notification.

With the foregoing and other objects in view there is also provided, in accordance with the invention, a non-transitory computer-readable medium having stored thereon a set of computer-executable instructions for performing the method described herein. The set of computer-executable instructions can be executed on a computer system having a client side with an Internet browser and a server side with a web-server and a server.

Other features which are considered as characteristic for the invention are set forth in the appended claims.

Although the invention is illustrated and described herein as embodied in notifying a client on server disconnection in a MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
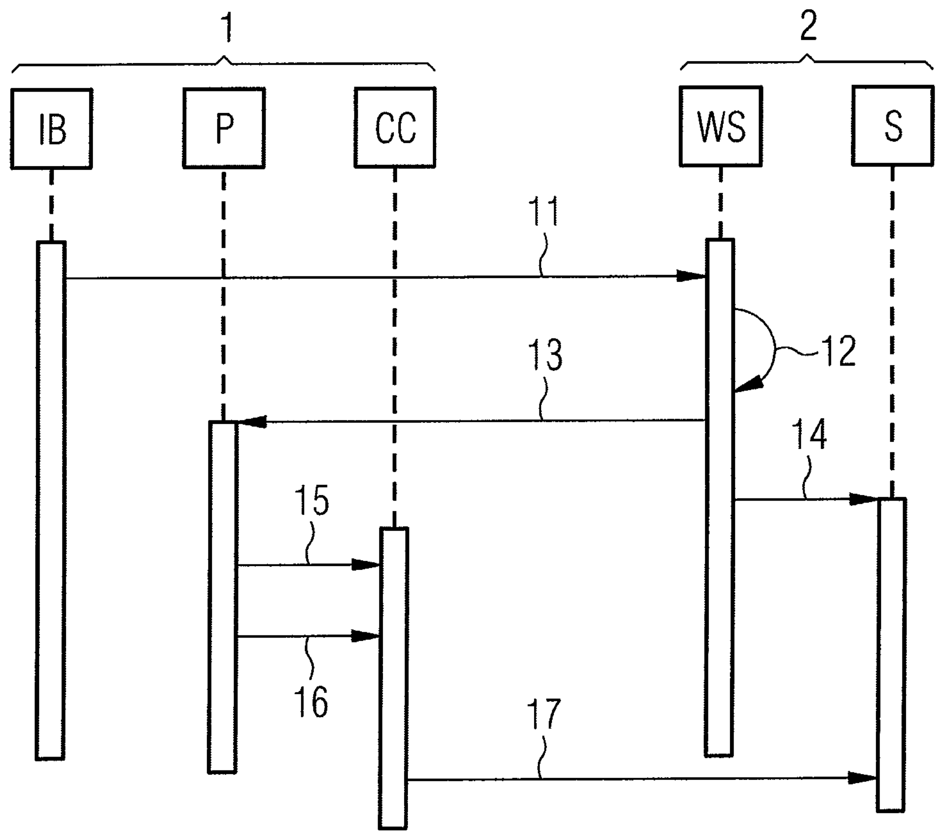
FIG. 1 is a message sequence diagram which schematically illustrates the establishment of a client-server connection in a MES system according to an embodiment of the present invention.
Figure 2:
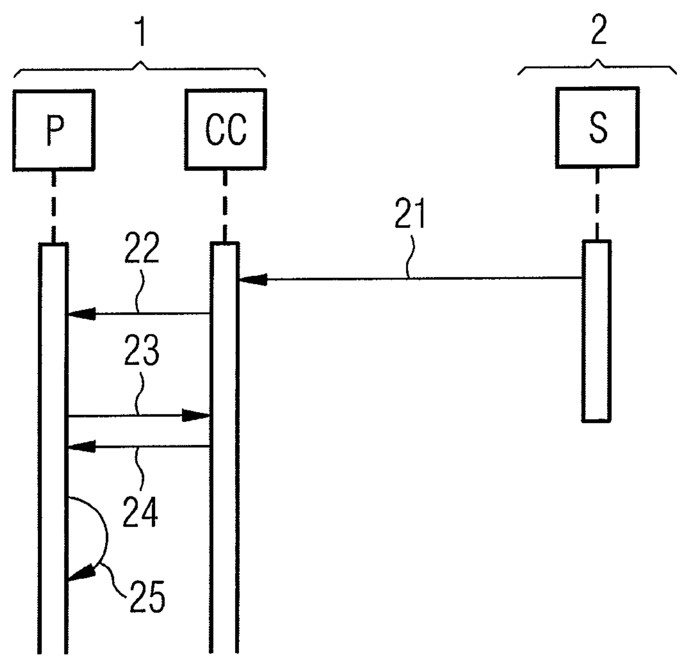
FIG. 2 a message sequence diagram which schematically illustrates a notification of a client-server disconnection in a MES system according to an embodiment of the present invention.

Reference is now had to the figures of the drawing in detail. At engineering time, system engineers define actions to be executed at run time in case of a client-server disconnection event.

Specifically, the system engineers write in the configuration file, data pointing to a custom function containing actions to be implemented in case of client-server disconnection event.

The configuration file is located on the web server machine and it is read every time the Internet browser requests a page to display.

In embodiments of the invention, the example of the configuration file for the CAB graphical development tool-kit is the CAB ASP.NET Config file.

In an exemplary embodiment of the invention, the data pointing to the custom function are the custom function name, e.g. "OnError", and the name of the file containing the function, e.g. a java script file called "customer1.js".

In another example embodiment, the file containing the function is a Visual Basic script file.

The system engineers write the code of the custom function in a function file, e.g. "customer1.js". The function file is stored in a web server.

As noted above, FIG. 1 illustrates a message sequence diagram relating to establishing of a client-server connection in a MES system according to an exemplary embodiment of the present invention.

The elements of FIG. 1 are part of the CAB environment. Those skilled in the pertinent art will readily understand that other types of environments are possible, for example environments of other types of MES graphical tool kits.

At the client side 1, three client elements are shown, an Internet browser IB, a page P and a communication component CC.

The connection between the Internet browser at the client side and the server is kept by mean of a communication component CC loaded on every CAB page.

This communication component CC is attached to the CAB screen from the CAB Web Server when a page P is requested.

The CAB Web Server WS, upon receiving a page request from the Internet browser IB, inserts on the page data for creating the communication component CC, for example this data may be an HTML tag.

The rendered page P displayed by the browser IB at the client side creates, at run-time, the communication component CC.

As soon as the screen is displayed on the Internet browser IB, the communication component CC contacts the server S and maintains a connection with the server S, via an interprocess communication mechanism, as long as the page is displayed on the internet browser IB.

The software communication component CC periodically contacts the server S in order to retrieve the data on the client.

At the server side 2, a web server WS and a server S are shown.

At run time, at step 11, the Internet browser IB requests the web server WS a web page P to be displayed. For example, the browser request may arrive from an end-user, e.g. a plant operator, at the client side, who is wishing to monitor a chart containing certain alarm parameter values of plant activity. In another example, the browser request is automatically generated by the client side.

At step 12, the web-server WS retrieves the data pointing to the custom function from the configuration file.

At step 13, the web-server WS attaches to the page P to be rendered the custom function data, the custom function file, and data for creating a communication component (CC).

Then the Internet browser (IB) loads the certain requested page (P) with the above data.

In embodiments of the present invention, the data pointing to the custom function are the custom function name and the file name containing the custom function. In other implementations of the present invention, the data pointing to the custom function are void and then default actions are to be executed in case of disconnection.

At step 14, the web-server WS, initiates the server S using the standard inter-process communication mechanism at the server side 2 in order to maintain a connection to the client side 1.

At step 15, the loaded page (P), creates the communication component CC at the client side 1 that is in charge to contact and maintain a connection with the server S as long as the page P is displayed on the internet browser IB.

In embodiments of the present invention, at step 16, the data pointing to the custom function are set/transferred from the page P to the communication component CC via the code written on the page P from the CAB Web Server WS.

At step 17, the communication component CC establishes a client-server connection.

In case the client-server disconnection event occurs, at step 21, the server S notifies the communication component CC about the disconnection.

Then in turn, the communication component CC notifies the certain loaded page P about the disconnection event.

When a disconnection event occurs, the loaded page P processes the notification by way of an event handler that will call the specified function. The event handler, located on the page P, has the task to catch the disconnection event and by means of the information stored in communication component CC or in the page itself P it executes the custom function.

The certain displayed page (P) executes the custom function that is located in the custom function file.

In embodiments of the present invention, the custom function data which were stored in the communication component CC as illustrated in step 16 are retrieved by the displayed page P from the communication component CC, as illustrated in steps 23 and 24.

Advantageously, the script supplied from system engineers is executed, giving the possibility of performing tailored action in response to a disconnection event.

In an embodiment of the present invention, the CAB application is fully based on Microsoft ASP.NET technology, so the CAB page is rendered on the client and the page is composed by HTML and scripting code.

Typical examples of custom actions that can be implemented by custom functions on server disconnection may be:

reloading the displayed page;

displaying a custom error page;

writing a log file; and/or any action achievable by a java-script on a web page.

In general, with embodiments of the present invention, it is possible to perform custom actions on a client-server disconnection and to deliver custom messages to the end-user.

In addition to the embodiments of the present invention described above, the skilled persons in the art will be able to arrive at a variety of other arrangements and steps which, if not explicitly described in this document, nevertheless fall within the scope of the appended claims.

The invention claimed is:

1. In a manufacturing execution system including a browser at a client side and a web-server and a server at a server side, a method for notifying a client on server disconnection, the method which comprises:

at engineering time:

a) defining actions to be executed at run time in case of a loss of a client-server connection, including the following sub-steps:

inserting, in a configuration file, data pointing to a custom function for implementing actions to be executed in case of the disconnection event;

placing code defining the actions to be implemented by the custom function into a function file;

storing the function file on the web-server;

at run time:

b) with the browser, requesting from the web-server a certain page to be displayed;

c) with the web-server, retrieving custom function data from the configuration file;

d) with the web-server, embedding in the certain page to be loaded by the Internet browser the following data: the custom function data, the custom function file, and data for creating a communication component;

e) loading the certain page with the Internet browser;

f) with the web-server, initiating the server at the server side to maintain a connection to the client side;

g) creating a communication component at the client side from the certain displayed page, for maintaining a connection to the server;

on occasion of the loss of the client-server connection:

h) with the server, notifying the communication component about the loss of the client-server connection;

i) with the communication component, notifying the certain displayed page about the disconnection; and j) executing the custom function with the certain displayed page.

2. The method according to claim 1, wherein the data pointing to the custom function comprise function file name and function name.

3. The method according to claim 1, wherein the function file is a java-script file or a visual basic file.

4. The method according to claim 1, wherein:

step g) further comprises transferring, with the certain displayed page, the custom function data to the communication component; and step i) further comprises retrieving, with the certain displayed page, the custom function data from the communication component.

5. The method according to claim 1, which comprises selecting the actions to be executed in case of a client-server disconnection event from the following group of actions:

reloading the displayed page;

displaying a custom error page;

writing a log file; and any action achievable by a java-script on a web page.

6. The method according to claim 1, implemented in software.

7. A non-transitory computer-readable medium having stored thereon a set of computer-executable instructions for performing a method when executed on a computer system having a client side with an Internet browser and a server side with a web-server and a server, the method which comprises:

a) with the Internet browser, requesting from the web-server a certain page to be displayed;

b) with the web-server, retrieving custom function data from a configuration file, wherein the configuration file has data pointing to a custom function for implementing actions to be executed in case of a loss of a client-server connection;

c) with the web-server, embedding in the certain page to be loaded by the Internet browser, the following data: the custom function data, a custom function file having code of actions to be implemented by the custom function, and data for creating a communication component;

d) loading the certain page with the Internet browser;

e) with the web-server, initiating the server at the server side to maintain a connection to the client side;

f) creating a communication component at the client side from the certain displayed page, for maintaining a connection to the server;

on occasion of the loss of the client-server connection:

g) with the server, notifying the communication component about the disconnection;

h) with the communication component, notifying the certain displayed page about the loss of the client-server connection; and i) executing the custom function with the certain displayed page.

8. A system comprising a computer having a client side with an Internet browser and a server side with a web-server and a server, the computer programmed to:

a) with the Internet browser, request from the web-server a certain page to be displayed;

b) with the web-server, retrieve custom function data from a configuration file, wherein the configuration file has data pointing to a custom function for implementing actions to be executed in case of a loss of a client-server connection;

c) with the web-server, embed in the certain page to be loaded by the Internet browser, the following data: the custom function data, a custom function file having code of actions to be implemented by the custom function, and data for creating a communication component;

d) load the certain page with the Internet browser;

e) with the web-server, initiate the server at the server side to maintain a connection to the client side;

f) create a communication component at the client side from the certain displayed page, for maintaining a connection to the server;

on occasion of the loss of the client-server connection:

g) with the server, notify the communication component about the loss of the client-server connection;

h) with the communication component, notify the certain displayed page about the disconnection; and i) execute the custom function with the certain displayed page.

* * * * *